H. Munger,
Water Wheel,
No. 4,844.          Patented Nov. 10 1846.
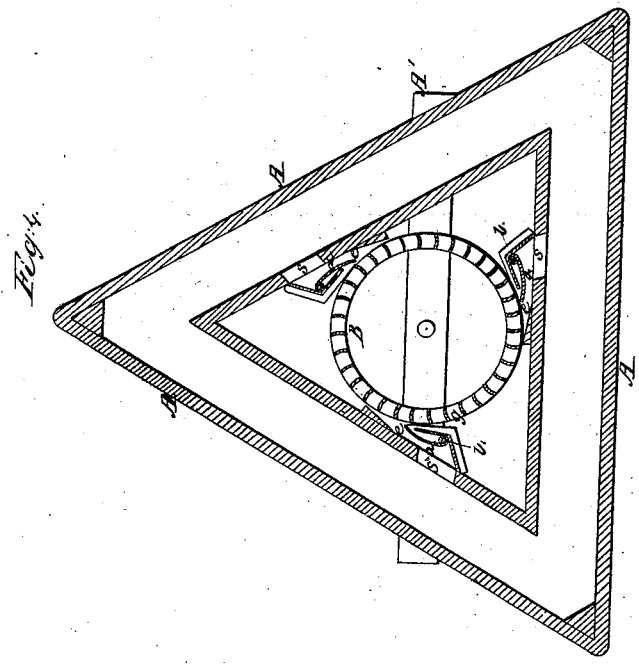
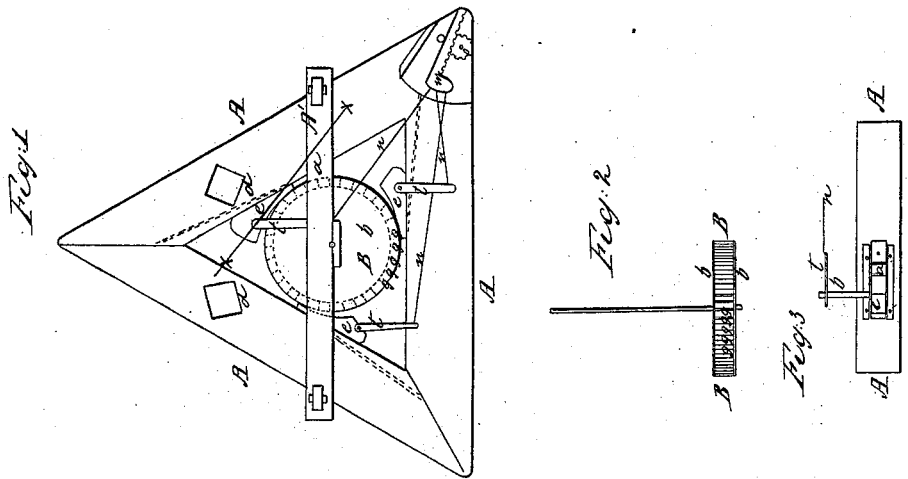
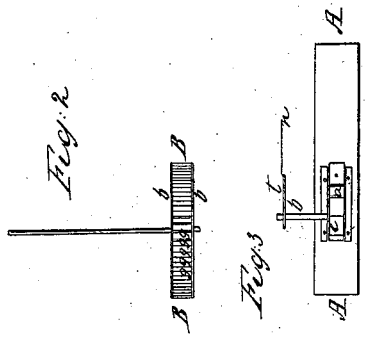

UNITED STATES PATENT OFFICE.

HIRAM MUNGER, OF CHICOPEE FALLS, MASSACHUSETTS.

IMPROVEMENT IN WATER-WHEELS.

Specification forming part of Letters Patent No. 4,844, dated November 10, 1846.

*To all whom it may concern:*

Be it known that I, HIRAM MUNGER, of Chicopee Falls, in the county of Hampden and State of Massachusetts, have invented new and useful Improvements in Water-Wheels and in the Mode of Applying Water thereto; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is a plan of the wheel and flumes; Fig. 2, an elevation of the wheel; Fig. 3, a vertical section at the line X X of Fig. 1, and Fig. 4 a horizontal section below the top plate of the wheel on a larger scale.

The same letters indicate like parts in all the figures.

The nature of my invention consists in applying the water to the outside of a wheel at three or more points when the water is discharged from a trunk surrounding the wheel and forming a three, four, or more sided figure around it, so that the water shall be discharged from the buckets of the wheel either inside or outside in proportion as the motion of the wheel is increased or retarded by the resistance, the angular form of the flume surrounding it admitting of the discharge of the water from the outside of the wheel by centrifugal force in the angles of the surrounding flume.

In that class of wheels known as the "turbine" the water has been applied either outside or inside and either discharging inside or outside; but I am not aware that in any case the wheel and flume have been so arranged that the water could be discharged inside or outside, or both together, according to the relative proportions of the power and resistance.

In the wheels heretofore made, when the water is applied outside and the buckets admit of discharge inward, the buckets and the flume or gates are so arranged that the water is constantly forced inward, and under no circumstances can it escape outward, and so of the wheels that receive the water from the inside; but under my arrangement the wheel is provided with buckets open inside and outside and forming segments of circles described on radial lines—that is, the chords of the segments coinciding with the radial lines—and this wheel is placed within a flume arranged around the wheel in a triangular or quadrangular figure, the chutes for the discharge of the water on the wheel being placed one on each face of this figure, whether it be a triangle, quadrangle, or other sided figure, so that the discharge of the water from the chutes onto the buckets shall be in tangents to the circles of that part of the wheel on which are arranged the buckets, so that when the wheel moves with a velocity equal or nearly equal to the discharge on the buckets it shall be discharged therefrom outside into the angles of the angular casing surrounding the wheel by the direction of the current striking and impelling the wheel and by the centrifugal action, and when the wheel is loaded and moves much slower than the jets of water impelling it then it shall be forced inward, gradually acting on portions of the buckets moving with less velocity as the water transfers its momentum to the wheel.

In the accompanying drawings, A represents three square tubes arranged and united to form a triangular figure on a horizontal plane, and of sufficient capacity to receive the horizontal wheel B within the triangle, the shaft thereof having its bearings in an appropriate frame A'. The buckets $g$ of this wheel are arranged between an upper disk $b$ and a lower ring $b'$, vertically, and are formed in segments of circles, the middle of one bucket being the center of curvature of the next, so that the chords of these segments shall be radii, or nearly so. Water is admitted to the triangular flume through two vertical trunks $d$ $d$, and passing around the triangular flume is discharged through an aperture $s$ in each of the inner faces of the triangle into the chutes $e$ $e$ $e$, the inner faces of which are circular, nearly corresponding with the circle of the wheel. The circular faces of the chutes are provided each with an aperture for the discharge of the water onto the buckets of the wheel, and within each chute there is a gate $a$, hung to a vertical spindle $l$, and so located as when closed to shut the aperture in the face of the flume, and thus shut off the water, and when open to direct the water in a tangential line onto the buckets of the wheel. The spindles $l$ $l$ $l$ are each provided with an arm $t$ and connected by a rod $n$ with a sliding rack m, operated by a pinion o, the turning of which will either open or close all the gates, so that by this means the discharge of the water can be regulated at pleasure. When the wheel is put up for a head of water of twelve feet or under, I make the flume-casing triangular; but when over twelve feet I then make it square, and if desired it may be made with a greater number of sides.

It will be obvious from the foregoing that the gates that govern the discharge of water onto the wheel may be governed by other means than that described above without changing the principle of my invention, and that the surrounding form of flume that incloses the wheel may be changed at pleasure so long as there is space left between the chutes for the free discharge of the water from the buckets of the wheel outwardly in tangential lines.

I am aware that the water has been discharged from a wheel at the bottom near the outside and the inside at the same time; but in that case it was discharged downward, or fell from the lower edge of the buckets and through openings in the permanent bottom over which the wheel moves, they (the buckets) being projected beyond the shrouding of the wheel into the chute which lets the water onto the wheel; but

What I claim as my invention, and desire to secure by Letters Patent, is—

The employment of a wheel having the shrouding extending out to the periphery of the buckets, which are open inside and outside when combined with a three or more sided flume surrounding it, which flume is provided with a chute on each face to discharge the water onto the wheel outside at given distances apart, leaving sufficient room between the chutes for the discharge of the water in tangential lines from the outside of the buckets, substantially as herein described, whereby the water is discharged mainly from the outside of the buckets when the wheel moves with a velocity equal or nearly equal to that of the water by which it is impelled, and mainly inside when it is loaded and moves much slower than the water by which it is impelled, as described.

HIRAM MUNGER.

Witnesses:
   THOS. C. SPOONER,
   ENOCH HOLCOMB, Jr.,
   RUSSELL E. DEWEY.